US010757068B2

(12) United States Patent
Leach et al.

(10) Patent No.: US 10,757,068 B2
(45) Date of Patent: *Aug. 25, 2020

(54) ENHANCED DOMAIN NAME TRANSLATION IN CONTENT DELIVERY NETWORKS

(71) Applicant: Fastly, Inc., San Francisco, CA (US)

(72) Inventors: Sean Leach, Denver, CO (US); Artur Bergman, San Francisco, CA (US); Tyler McMullen, San Francisco, CA (US); Alan Kasindorf, Mountain View, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,516

(22) Filed: Dec. 26, 2018

(65) Prior Publication Data

US 2019/0273713 A1    Sep. 5, 2019

Related U.S. Application Data

(63) Continuation of application No. 14/989,493, filed on Jan. 6, 2016, now Pat. No. 10,178,065.

(60) Provisional application No. 62/235,866, filed on Oct. 1, 2015.

(51) Int. Cl.
*H04L 12/24* (2006.01)
*H04L 29/12* (2006.01)
*H04L 29/08* (2006.01)

(52) U.S. Cl.
CPC ...... *H04L 61/1511* (2013.01); *H04L 61/1552* (2013.01); *H04L 67/18* (2013.01); *H04L 67/2842* (2013.01)

(58) Field of Classification Search
CPC . H04L 61/1511; H04L 61/1552; H04L 67/18; H04L 67/2842
USPC .......................................................... 709/245
See application file for complete search history.

(56) References Cited

U.S. PATENT DOCUMENTS

| 7,653,700 | B1 * | 1/2010 | Bahl ................. H04L 29/12009 709/216 |
| 10,305,797 | B2 * | 5/2019 | Richardson ....... H04L 29/08099 |
| 2002/0004846 | A1 * | 1/2002 | Garcia-Luna-Aceves ................... G06F 12/1483 709/245 |

(Continued)

*Primary Examiner* — Moustafa M Meky
*Assistant Examiner* — Elizabeth Kassa

(57) ABSTRACT

Systems, methods, apparatuses, and software for operating content delivery networks are provided herein. In one example, a method of operating a domain name translation node in a first point-of-presence of a content delivery network is presented. The method includes receiving a translation message issued by an end user device for translation of a domain name into a content network address, and processing the translation message to identify a network address of a node that transferred the translation message. The method also includes selecting the content network address based at least in part on correlations between network addresses and performance factors to direct the end user device to a target cache node at a point-of-presence different than the point-of-presence of the domain name translation node, and transferring a response message indicating the content network address which directs the end user device to the target cache node at the second point-of-presence.

20 Claims, 7 Drawing Sheets

(56) References Cited

U.S. PATENT DOCUMENTS

| | | | | |
|---|---|---|---|---|
| 2002/0052942 | A1* | 5/2002 | Swildens | G06F 9/505 |
| | | | | 709/223 |
| 2006/0075139 | A1* | 4/2006 | Jungck | H04L 29/12066 |
| | | | | 709/245 |
| 2006/0271655 | A1* | 11/2006 | Yoon | H04L 67/1008 |
| | | | | 709/223 |
| 2010/0125673 | A1* | 5/2010 | Richardson | H04L 29/12066 |
| | | | | 709/239 |
| 2010/0257258 | A1* | 10/2010 | Liu | H04L 29/12066 |
| | | | | 709/220 |
| 2012/0054271 | A1* | 3/2012 | Leroy | G06Q 10/107 |
| | | | | 709/203 |
| 2012/0179839 | A1* | 7/2012 | Raciborski | H04L 29/12066 |
| | | | | 709/245 |
| 2012/0303735 | A1* | 11/2012 | Raciborski | H04L 29/12066 |
| | | | | 709/212 |
| 2015/0215388 | A1* | 7/2015 | Kontothanassis | H04L 67/1002 |
| | | | | 709/226 |
| 2015/0222535 | A1* | 8/2015 | Bergman | H04L 43/16 |
| | | | | 709/213 |
| 2016/0286001 | A1* | 9/2016 | Chan | H04L 12/6418 |

* cited by examiner

FIGURE 7

REDIRECTION TABLE 700

| SOURCE NETWORK ADDRESS RANGES | CACHE NODE / POP |
|---|---|
| 200.200.201.X – 200.200.300.X | (SP) 150.140.130.111 |
| 200.200.301.X – 200.200.400.X | (HK) 150.140.131.111 |
| 200.200.401.X – 200.200.500.X | (JP) 150.140.132.111 |
| 500.200.101.X – 500.200.200.X | (MY) 150.140.132.111 |

ENHANCED DOMAIN NAME TRANSLATION IN CONTENT DELIVERY NETWORKS

RELATED APPLICATIONS

This application is a continuation of U.S. patent application Ser. No. 14/989,493, entitled "ENHANCED DOMAIN NAME TRANSLATION IN CONTENT DELIVERY NETWORKS," filed Jan. 6, 2016, which also claims the benefit of priority to U.S. Provisional Patent Application 62/235,866, entitled "ENHANCED DOMAIN NAME TRANSLATION IN CONTENT DELIVERY NETWORKS," filed Oct. 1, 2015, each of which is hereby incorporated by reference in their entirety.

TECHNICAL FIELD

Aspects of the disclosure are related to the field of content delivery networks and handling of domain name translation in content delivery networks.

TECHNICAL BACKGROUND

Network-provided content, such as web pages which can include media content, videos, pictures, music, and the like, are typically served to end users via networked computer systems. End user requests for the network content are processed and the content is responsively provided over various network links. These networked computer systems can include origin or hosting servers which originally host network content, such as web servers for hosting a news website. However, these computer systems of individual content origins or hosts can become overloaded and slow due to frequent requests of content by end users.

Content delivery networks have been developed which add a layer of caching between original servers of the content providers and the end users. The content delivery networks typically have one or more cache nodes distributed across a large geographic region to provide faster and lower latency access to the content for the end users. When end users request content, such as a web page, which is handled through a cache node, the cache node is configured to respond to the end user requests instead of the origin servers. In this manner, a cache node can act as a proxy or cache for the content origin servers. Content of the origin servers can be cached into the cache nodes, and can be pre-cached in the cache nodes from origin servers when the content has not yet been cached.

To reach the network content, end user devices typically first resolve domain name information before requesting content from a particular cache node. Domain name resolution is typically handled by top-level domain name system (DNS) servers which may delegate resolution to additional subordinate DNS servers. These DNS servers translate user-facing domain names into numerical network addresses so that a request for content can be issued by an end user device for the content. However, the limited number and distribution of DNS servers can add latencies and slowdowns into the domain name resolution process as well as the entire content request process.

Overview

Systems, methods, apparatuses, and software for operating content delivery networks are provided herein. In one example, a method of operating a domain name translation node in a first point-of-presence of a content delivery network is presented. The method includes receiving a translation message issued by an end user device for translation of a domain name into a content network address, and processing the translation message to identify a network address of a node that transferred the translation message. The method also includes selecting the content network address based at least in part on correlations between network addresses and performance factors to direct the end user device to a target cache node at a point-of-presence different than the point-of-presence of the domain name translation node, and transferring a response message indicating the content network address which directs the end user device to the target cache node at the second point-of-presence.

In another example, a computer apparatus to operate a domain name translation node is provided. The computer apparatus includes processing instructions that direct the cache node, when executed by the cache node, to receive a translation message issued by an end user device for translation of a domain name into a content network address, process the translation message to identify a network address of a node that transferred the translation message, select the content network address based at least in part on correlations between network addresses and performance factors to direct the end user device to a target cache node at a second point-of-presence, and transfer a response message indicating the content network address which directs the end user device to the target cache node at the second point-of-presence. The computer apparatus also includes one or more non-transitory computer readable media that store the processing instructions.

In another example, a method of operating a content delivery network that caches content for delivery to end user devices using cache nodes distributed over a plurality of points-of-presence. The method includes, in a local DNS node associated with a first point-of-presence of the content delivery network serving a first geographic location, receiving a DNS query for translation of a domain name into a content network address, the DNS query issued by an end user device and delegated by a DNS server to the local DNS node. The method also includes, in the local DNS node, processing the DNS query to identify at least a network address of the DNS server, processing the network address of the recursive DNS server against a data structure comprising performance correlations between network address ranges and the plurality of points-of-presence to identify a selected content network address of a cache node associated with a target point-of-presence, and transferring a DNS response indicating the selected content network address of the cache node associated with the target point-of-presence. The method also includes, in the cache node associated with the target point-of-presence, receiving a content request directed to the selected content network address and responsively providing content for delivery to the end user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

FIG. 7 illustrates a translation table.

DETAILED DESCRIPTION

Network content, such as web content, typically comprises text, hypertext markup language (HTML) pages, pictures, digital media content, video, audio, code, scripts, or other content viewable and rendered by an end user device in a browser or other specialized application. To reach this network content, end user devices typically browse among content of web pages that is referenced using domain names instead of numerical addresses. These domain names include examples such as www.alpha.com, www.beta.net, among other examples. To reach the network content, which might be cached by cache nodes of a content delivery network, end user devices typically first resolve this domain name information before requesting content from a particular cache node using a numerical address. Domain name resolution is typically handled by top-level or authoritative domain name system (DNS) servers which may delegate resolution to additional subordinate or DNS servers. These DNS servers translate the user-facing domain names into numerical network addresses so that a request for content can be issued by an end user device for the content.

Content delivery networks can add a layer of caching between origin servers of the content providers and the end users. The content delivery networks typically have one or more cache nodes distributed across a large geographic region to provide faster and lower latency local access to the content for the end users. Furthermore, the content delivery networks can have several points-of-presence (POPs), each of which can serve a particular geographic location. When end users request content, such as a web page, a selected cache node will respond to the content request instead of the associated origin server. Various techniques can be employed to ensure the cache node responds to content requests instead of the origin servers, such as associating web content of the origin servers with network addresses of the cache nodes instead of network addresses of the origin servers using DNS registration and lookup procedures.

Figure 1:
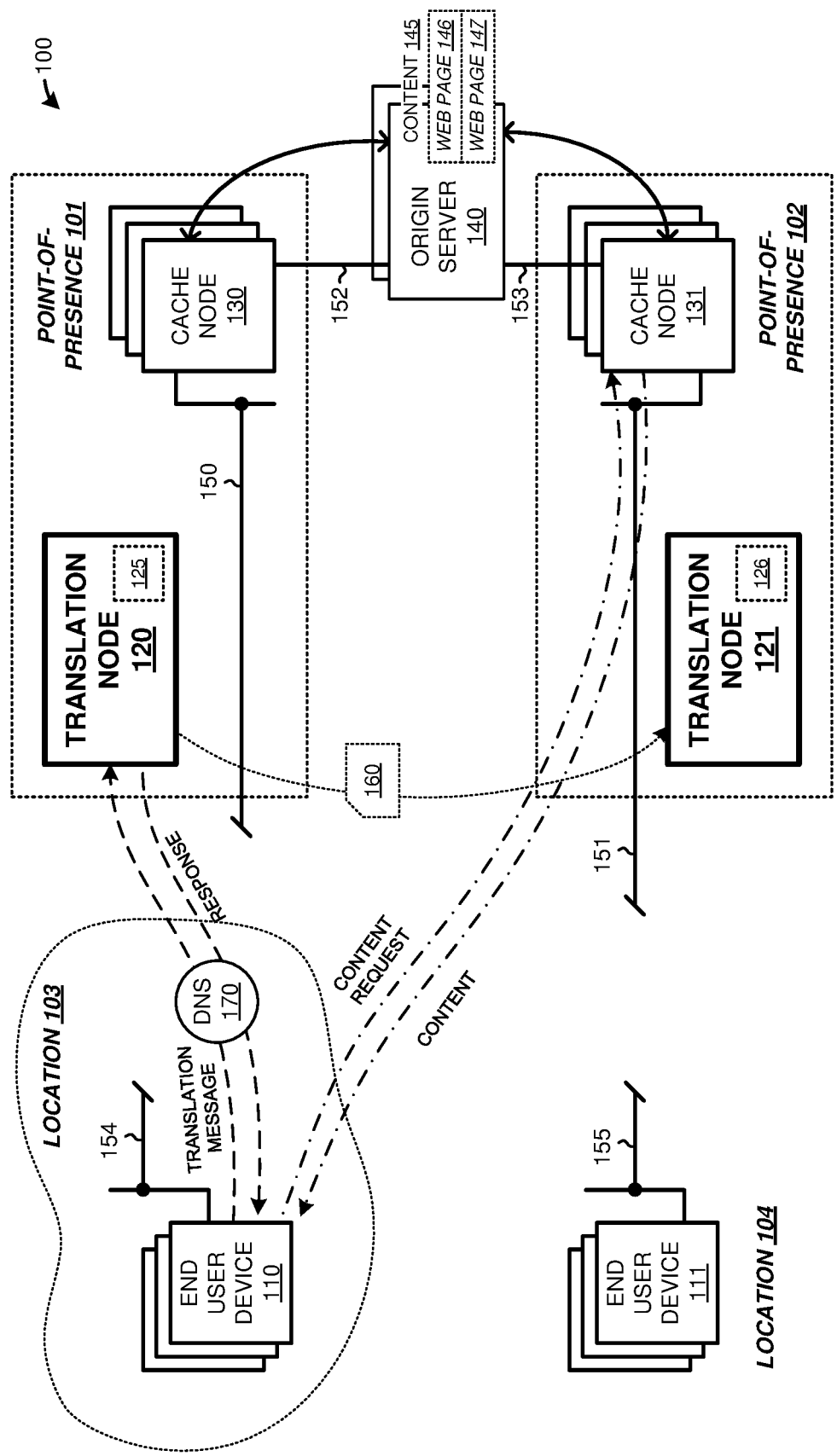
FIG. 1 illustrates a communication system.

As a first example employing a content delivery network, FIG. 1 is a system diagram illustrating communication system 100. Communication system 100 includes end user devices 110-111, translation nodes 120-121, cache nodes 130-131, DNS server 170, and origin server 140. Cache nodes 130-131 communicate with at least end user devices over associated network links 150-151. Cache nodes 130-131 communicate with origin server 140 over associated network links 152-153. End user devices 110-111 can each communicate with any of translation nodes 120-121 or cache nodes 130-131 over associated network links 154-155.

In operation, cache nodes 130-131 cache content of at least origin server 140. This content can include web pages, media content, data, executable code, scripting content, among other types of content deliverable over network links 150-151. Cache nodes 130-131 each deliver content upon request to end user devices over associated network links 150-151, which can comprise packet links, such as Internet protocol (IP) links. By caching the content of origin server 140 or other origin servers, cache nodes 130-131 can provide faster access to this content to end user devices, such as end user devices 110-111. In many examples, a plurality of cache nodes are included in a content delivery network (CDN) which provides cache nodes distributed over a large geographic area for lower latency access to content normally provided by one or more origin servers. Cache nodes 130-131 can also cache dynamic content, such as content generated responsive to activities of end user devices 110-111.

In FIG. 1, two different points-of-presence (POPs) are shown, namely POP 101 and POP 102. Each POP can be associated with a different geographic location. For example, POP 101 can be associated with location 103, and POP 102 can be associated with location 104. Location 103 is served by POP 101 and translation node 120 and includes cache node 130, which can comprise one or more cache elements. Location 104 is served by POP 102 and translation node 121 and includes cache node 131, which can also comprise one or more cache elements. Each POP can serve content delivery needs for a particular geographic region, such as a country or countries, or a sub-portion of a country. In some examples, a POP is established to server a company, office, or facility.

In this example, each location has an associated translation node. These translation nodes handle translation of domain names into numerical addresses, such as network addresses. The network addresses can point to specific ones of cache nodes 130-131 and can be used to route end user traffic to selected cache nodes even though a common or shared domain name is used by end user devices to reach the content. For example, a user might request content for www.alpha.com, and have a domain name translation process initiated with translation node 120 which resolves the domain name into a network address to reach a cache node. However, when end user devices are located in different locations than the translation node or the cache nodes to which requests are directed, then latencies in communications and processing can lead to slower performance and a slower delivery of the requested network content to the end user device.

Figure 2:
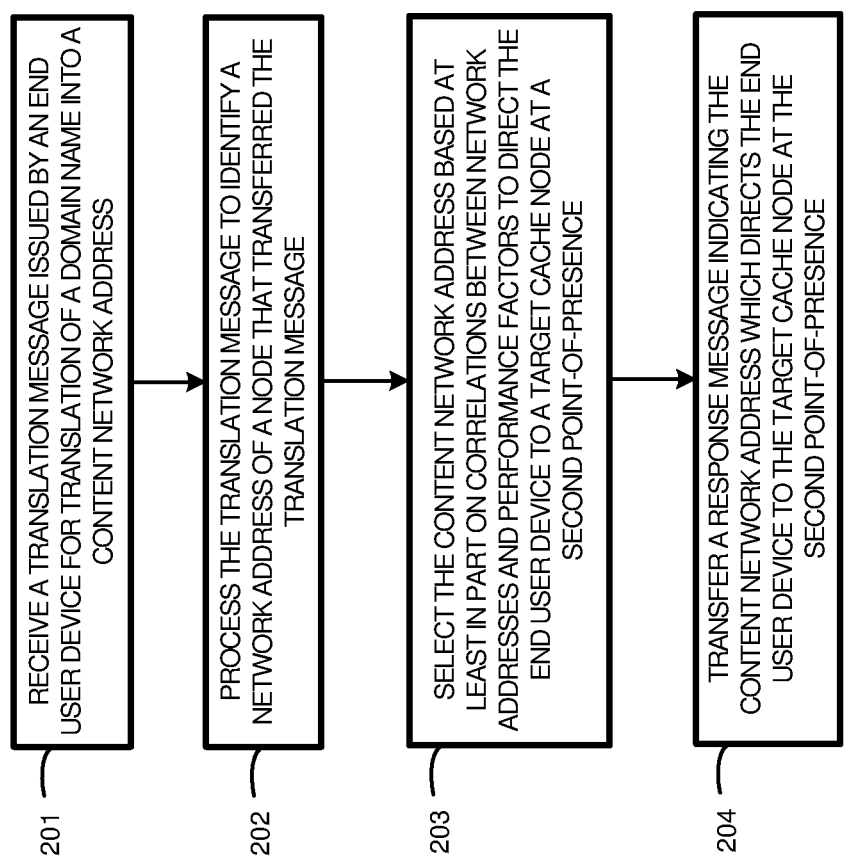
FIG. 2 illustrates a method of operation of a domain name translation node.

To further illustrate example operations of system 100, FIG. 2 is provided. FIG. 2 is a flow diagram illustrating a method of operating translation node 120. The operations of FIG. 2 are referenced below parenthetically, and can also be applied to translation node 121. In FIG. 2, translation node 120 receives (201) a translation message issued by an end user device for translation of a domain name into a content network address. In this example, end user device 110 transfers a translation message for delivery to a translation node, which is first received by DNS server 170. DNS server 170 forwards this translation message on to translation node 120 based on routing information, such as a DNS record, maintained by DNS server 170. Translation node 120 receives this translation message. In some examples, this hierarchical DNS scheme is employed, and end user device 110 transfers the translation message for delivery to a top level or authoritative DNS node 170, which then delegates the translation message for handling by translation node 120. In other examples, end user device 110 transfers the translation message for delivery to translation node 120 without an intervening DNS server involved.

The translation message comprises one or more packets. Translation message requests translation of a domain name to a network address, and can include a domain name to be translated or resolved as well as other information, such as a network address of end user device 110. When forwarded by DNS server 170, the translation message can also include a network address of DNS server 170. Other information associated with the domain name can be included, such as pathnames, network protocol type indicators, and other information related to properties of the domain name and the end user device. In some examples, the translation message comprises a DNS query message.

Translation node 120 processes (202) the translation message to identify a network address of a node that transferred the translation message. As mentioned above, translation message can include various properties associated with the domain name as well as with the node that requests translation, such as end user device 110 or a DNS node or server that forwarded the translation message. Translation node 120 identifies a network address associated with a node that transferred the translation message, such as a network address of end user device 110 or of DNS server 170. This network address can comprise an IP address or other network address. In some examples, the network address of the transferring node is included in header portions of translation message.

Translation node 120 selects (203) a content network address based at least in part on correlations between network addresses and performance factors to direct the end user device to a target cache node at a second point-of-presence. Translation node 120 includes one or more data structures comprising correlations between network addresses and performance factors to select a target cache node or point-of-presence to handle the translation message. Data structure 125 is shown in FIG. 1, which can comprise a table, database, map, or other data structure which correlates at least network addresses of requesting nodes or DNS nodes to geographic locations or performance data related to translation of domain names and to performance data of providing content from associated cache nodes. For example, data structure 125 can comprise various ranges of network addresses which correspond to specific geographic areas, such as countries, sub-countries, regions, companies, premises, or other physical areas. These network address ranges can also be correlated to performance information, such as latency statistics.

Translation node 120 will select a cache node for handling of content requests associated with the translation message based on which cache node or POP will offer the best performance to an end user device when servicing subsequent content delivery from associated cache nodes. For example, if end user device 110 is in location 103, which can comprise a first geographic area which is shared with translation node 121 and cache nodes 131, then translation node 120 can redirect handling of content requests to POP 102 instead of POP 101. Other considerations can be employed in the redirection determination, such as a currently traffic loading of equipment of POP 101 and 102. But in this example, a performance relationships between network addresses and POPs are used to identify POP 102 as having the best potential performance for end user device 110. In some examples, the a network address of end user device 110 is used to make this determination, while in other examples, a network address of DNS 170 is used to make this determination.

Data structure 125 contents can be established in various ways. In some examples, the data structure contents are established by monitoring many domain name translation requests and associated content delivery, and identifying a performance or latency involved with the servicing of those requests and content. Translation latencies include a time delay from when an end user device transfers a domain name translation message until the end user device receives a network address responsive to the domain name translation message. Content delivery latencies can include a time delay from when an end user device requests content until the content is delivered to the end user device. In other examples, a translation node can identify these latencies by analyzing delays of associated communication links between the end user device and the translation node. In other examples, many translation nodes can be employed which all monitor service statistics for handling of content requests, and correlations between network address ranges of end user devices and geographic regions can be identified that give the best performance to end user devices in those geographic regions. It should be understood that performance of content delivery is optimized and geographic location is merely one consideration among many.

In yet further examples, executable or interpreted code can be embedded in the content delivered to end user devices which initiate the domain name translation requests and which monitor latencies involved in receiving responses to associated domain name translation requests and content delivery. For example, a user can be browsing a web page and click on a link in that web page which links to another piece of content which requires a domain name lookup or domain name translation. Web pages typically comprise hypertext markup language (HTML), Javascript, executable code, scripts, cascading style sheets (CSS), links, or extensible markup language (XML), among other elements and content types. The web page can have monitoring code or scripting elements embedded therein which monitors performance statistics of user requests for domain name translation or content requests. For example, these performance statistics can include a response time from when the user requests the content until a network address is delivered to the user device, as well as a time for delivery of the associated content. Statistical information related to delivery latency of the network address of the content and the delivery latency of the content can be collected and transferred to a processing node, such as a translation node, which collects the statistical information and derives correlations between the network address of the user device and the geographic location of the user device. Cache nodes and associated POPs can be ranked and categorized according to performance for various network address ranges, and any new requests or translation messages can be routed or redirected to POPs or cache nodes based on the best performing POPs associated with the network addresses, among other considerations.

Translation node 120 transfers (204) a response message indicating the content network address which directs the end user device to the target cache node at the second point-of-presence. Response message in FIG. 1 can be delivered first to DNS 170 which then forwards to end user device 110. In other examples, translation node 120 transfers the response message without DNS 170 as an intermediary. Responsive to receiving the response message, end user device 110 can identify a network address of a cache node from which content is to be requested. In this example, the response message indicates a network address of cache node 131 and end user device 110 issues one or more content requests for content from cache node 131. As seen in FIG. 1, cache node 131 is associated with POP 102 which is different than POP 101 which received and serviced the translation message. To complete the retrieval of content, such as a web page, end user device 110 issues a content request, such as by using an HTTP GET request to a URL or network address associated with the content.

In FIG. 1, two example web pages are cached by cache node 130-131, namely web pages 146-147. These web pages can be originally hosted by origin server 140, such as shown in FIG. 1, although separate origin servers can be used. Cache nodes 130-131 can cache any of web pages 146-147 in one or more storage media of cache nodes 130-131. The caching can be done responsive to end user requests for the associated web page content or preemptive before end user requests. Cache nodes 130-131 can cache the web pages themselves, along with any content linked to or referenced by the web pages. Web pages 146-147 can include any web content 145 accessible through a browser application or specialized application executed by end user devices. For example, web pages 146-147 can include various code and scripts which link to media content, pictures, audio, text, objects, forms, data, or other network content. Cache node 131 can the return content as requested to end user device 110.

In further examples, instead of translation node 120 handling the translation message, translation node 120 identifies a different translation node to handle the translation message. FIG. 1 shows this example with redirection message 160 which transfers the translation message for delivery to translation node 121. Translation node 121 can then translate a domain name in the translation message into a content network address, such as a network address handled by cache node 131, and deliver a response message to end user device 110 indicated the network address of cache node 131.

Returning to the elements of FIG. 1, end user devices 110-111 can each be a user device, subscriber equipment, customer equipment, access terminal, smartphone, smartwatch, personal digital assistant, computer, tablet computing device, e-book, Internet appliance, media player, game console, kiosk computer, server, or some other user communication apparatus, including combinations thereof.

Translation nodes 120-121 can each include communication interfaces, network interfaces, processing systems, computer systems, microprocessors, storage systems, storage media, or some other processing devices or software systems, and can be distributed among multiple devices. Examples of translation nodes 120-121 can each include software such as an operating system, logs, databases, utilities, drivers, networking software, and other software stored on a computer-readable medium. In the examples herein, translation nodes 120-121 each comprise one or more associated data structures 125-126 which correlate network addresses of requesting devices or nodes to geographic locations to select translation nodes to redirect translation traffic. In some examples, translation nodes 120-121 each comprise DNS servers, including variations and improvements thereof.

Cache nodes 130-131 can each include communication interfaces, network interfaces, processing systems, computer systems, microprocessors, storage systems, storage media, or some other processing devices or software systems, and can be distributed among multiple devices. Examples of cache nodes 130-131 can include software such as an operating system, logs, databases, utilities, drivers, networking software, and other software stored on a computer-readable medium.

Origin server 140 can include communication interfaces, network interfaces, processing systems, computer systems, microprocessors, storage systems, storage media, or some other processing devices or software systems, and can be distributed among multiple devices. Examples of origin server 140 can include software such as an operating system, logs, databases, utilities, drivers, networking software, and other software stored on a computer-readable medium.

DNS node 170 can include communication interfaces, network interfaces, processing systems, computer systems, microprocessors, storage systems, storage media, or some other processing devices or software systems, and can be distributed among multiple devices. Examples of DNS node 170 can include software such as an operating system, logs, databases, utilities, drivers, networking software, and other software stored on a computer-readable medium. DNS node 170 can comprise one or more DNS records which correlate network addresses of further translation nodes or DNS nodes which can handle domain name translation. In some examples, DNS node 170 comprises an authoritative DNS server or a recursive DNS server.

Communication links 150-153 each use metal, glass, optical, air, space, or some other material as the transport media. Communication links 150-153 can each use various communication protocols, such as wireless communications, cellular communications, Long Term Evolution (LTE), IEEE 802.11 (WiFi), Internet Protocol (IP), Ethernet, synchronous optical networking (SONET), hybrid fiber-coax (HFC), circuit-switched, communication signaling, or some other communication format, including combinations, improvements, or variations thereof. Communication links 150-153 can each be a direct link or can include intermediate networks, systems, or devices, and can include a logical network link transported over multiple physical links. Although one main link for each of links 150-153 is shown in FIG. 1, it should be understood that links 150-153 are merely illustrative to show communication modes or access pathways. In other examples, further links can be shown, with portions of the further links shared and used for different communication sessions or different content types, among other configurations. Communication links 150-153 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
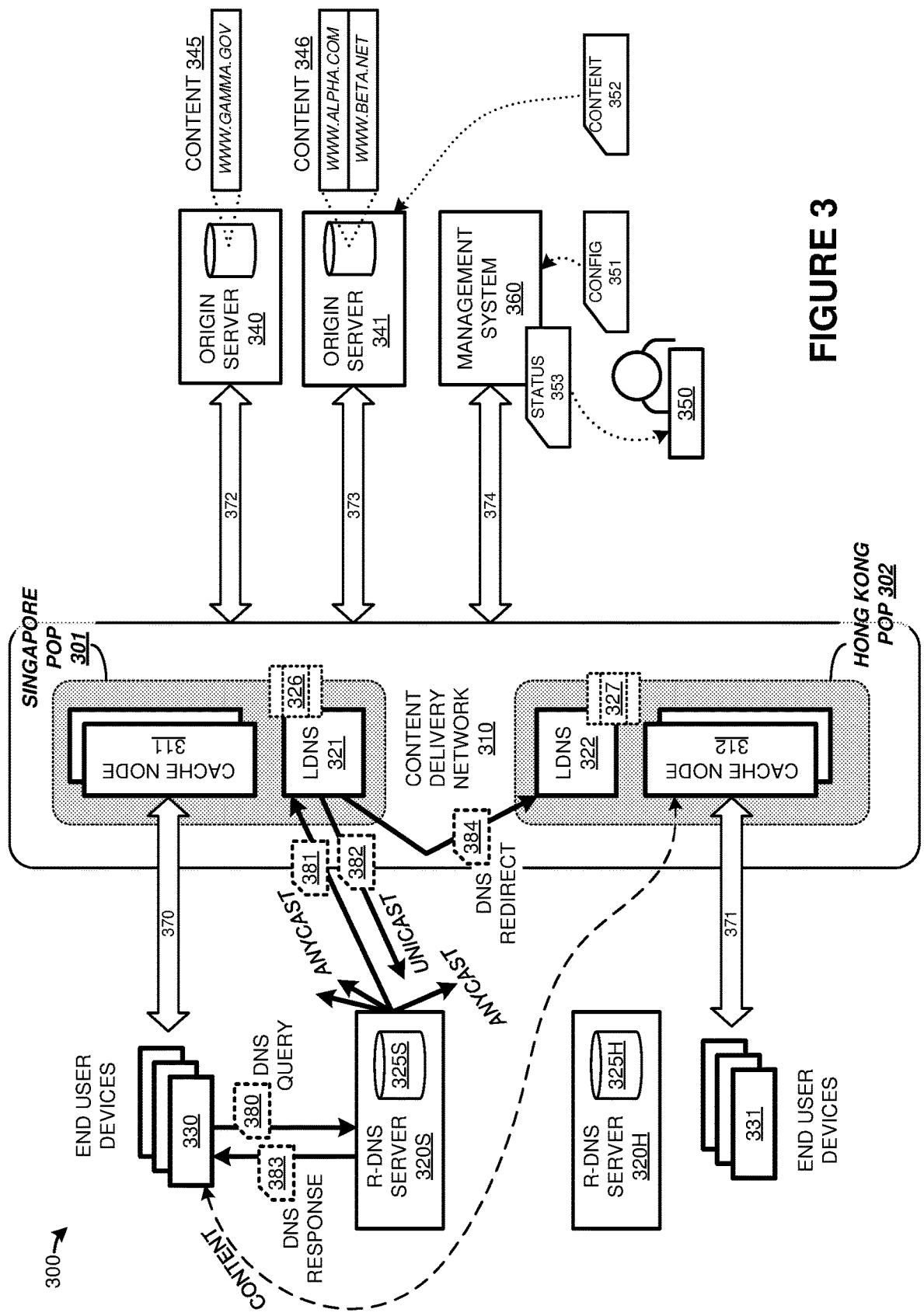
FIG. 3 illustrates a communication system.

To further illustrate the operation of a content delivery network employing one or more translation nodes, FIG. 3 is presented. FIG. 3 is a system diagram illustrating communication system 300. Communication system 300 includes content delivery network 310, cache nodes 311-312, recursive DNS (R-DNS) servers 320S and 320H, local DNS (L-DNS) nodes 321-322, end user devices 330-331, origin servers 340-341, operator device 350, and management system 360.

Content delivery network 310 includes one or more cache nodes (CN) 311-312 organized into at least two points-of-presence (POPs) 301-302. Each of CN 311-312 can include one or more data storage systems for caching of content retrieved from origin servers 340-341. End user devices 330-331 are representative of a plurality of end user devices which can request and receive network content, and any number of end user devices 330-331 can be associated with each of cache nodes 311-312. CN 311-312 and ones of end users 330-331 communicate over associated network links 370-371. Content delivery network 310 and origin servers 340-341 communicate over associated network links 372-373. Content delivery network 310 and management system 360 communicate over link 374. Although not shown in FIG. 3 for clarity, each of CN 311-312 can also communicate with each other over one or more network links. Although not shown in FIG. 3 for clarity, each of L-DNS nodes 321-322 can also communicate with each other and with the elements of FIG. 3 over one or more network links.

In operation, end user devices 330-331 request network content, such as content 345-346 associated with origin servers 340-341. Instead of these requests being handled by the individual origin servers 340-341, individual cache nodes 311-312 of content delivery network 310 receive the content requests over ones of links 370-371 and processes the content requests for delivery of the content to the associated end user devices 330-331. Requested network content that is already stored in ones of CN 311-312 can be provided quickly to the end user devices, while network content that is not already stored in ones of CN 311-312 can be responsively requested by an associated one of CN 311-312 from an appropriate origin server 340-341 for delivery by the CN and possible caching by the CN. In this manner, each of CN 311-312 can act as intermediary proxy nodes to provide local and fast access for end user devices 330-331 to network content of origin servers 340-341 without burdening origin servers 340-341.

POPs 301-302 in FIG. 3 can comprise equipment and systems hosted at a particular physical site which serves an associated geographic area. This geographic area can include countries, regions of countries, continents, and other areas defined by geography and political boundaries. This geographic area can also comprise company or organization locations, such as buildings and campuses, or other locations and sites. In FIG. 3, two POPs are shown, one associated with the country Singapore and one associated with the country Hong Kong, although these are merely representative of possible scenarios. In addition to having equipment stationed physically in a geographic location of the POP, each POP in FIG. 3 has a dedicated DNS node, namely a local DNS node. This L-DNS node can serve domain name translation for a collection of domains served by cache nodes co-located at the POP with the L-DNS node. Specifically, L-DNS node 321 can serve domain name translation for traffic handled by cache node 311, and L-DNS node 322 can serve domain name translation for traffic handled by cache node 312.

Each L-DNS node can handle domain name resolution or domain name translation for domain names managed by content delivery network 310. In the domain name system environment shown in FIG. 3, an authoritative DNS server, such as R-DNS server 320S and 320H, can include associated databases 325S and 325H indicating DNS records. R-DNS server 320S and 320H delegates domain name translation requests, such as DNS queries, to one of L-DNS node 321 and L-DNS node 322. Whichever L-DNS node receives the DNS query then translates a requested domain name into a network address, typically for an associated cache node which caches the network content associated with the domain name.

In FIG. 3, DNS records 325S/325H correlate anycast network addresses to domain names for content handled by content delivery network 310. In anycast addressing, a single network address can be used to route traffic to one destination among a plurality of destination nodes using the single network address. In contrast, unicast addressing comprises point-to-point network addressing, with a one-to-one correlation between a network address and a destination. Anycast routing can select a destination node based on a "nearest" metric, using various network routing techniques to select the nearest destination, which may consider response times of nearby routers to select which destination node to route the DNS query to.

However, when the anycast routing transfers a DNS query to a first L-DNS node for servicing, that L-DNS node may not be the ideal L-DNS node from a performance standpoint for the requesting device. For example, end user device 330 might be in Hong Kong and anycast routing used by R-DNS server 320H might select L-DNS node 321 in Singapore to service the DNS query instead of selecting L-DNS node 322 in Hong Kong to service the DNS query. This may lead to lower performance for end user device 330, such as due to a higher latency for communications that have to be routed between end user device 330 in Hong Kong to L-DNS node 321 Singapore. Moreover, L-DNS node 321 is typically configured to translate domain names into network addresses associated with cache node 311 or other cache nodes at POP 301 in Singapore which can lead to further performance issues when end user device 330 is receiving content from cache node 311. In the examples herein, an L-DNS node can select a cache node in a POP or associated with another L-DNS node which can provide better performance for the requesting device and can be provided using the anycast process.

Management system 360 handles configuration changes and status information collection and delivery for system operators and for the origin server operators or managers. For example, operator device 350 can transfer configuration 351 for delivery to management system 360, where configuration 351 can alter the handling of network content requests by CN 311-312, among other operations. Also, management system 360 can monitor status information for the operation of L-DNS nodes 321-322 and CN 311-312, such as operational statistics, latency, and performance statistics, and provide this status information as to operator device 350 or for collection into data structures, such as maps, which correlate performance seen by end user device to particular POPs. Furthermore, operator device 350 can transfer content 352 for delivery to origin servers 340-341 to include in content 345-346. Although one operator device 350 is shown in FIG. 3, it should be understood that this is merely representative and communication system 300 can include many operator devices for receiving status information, providing configuration information, or transferring content to origin servers.

Cache nodes 311-312, R-DNS servers 320S and 320H, L-DNS nodes 321-322, origin servers 340-341, and management system 360 can each include communication interfaces, network interfaces, processing systems, computer systems, microprocessors, storage systems, storage media, or some other processing devices or software systems, and can be distributed among multiple devices. Examples of cache nodes 311-312, R-DNS server 320S and 320H, L-DNS nodes 321-322, origin servers 340-341, and management system 360 can each include software such as an operating system, logs, databases, utilities, drivers, networking software, and other software stored on a computer-readable medium. Content delivery network 310, in addition to including CN 311-312 and L-DNS nodes 321-322, can include equipment and links to route communications between CN 311-312 and any of end user devices 330-331, R-DNS server 320S and 320H, origin servers 340-341, and management system 360, among other operations.

End user devices 330-331 can each be a user device, subscriber equipment, customer equipment, access terminal, smartphone, smartwatch, personal digital assistant, computer, tablet computing device, e-book, Internet appliance, media player, game console, or some other user communication apparatus, including combinations thereof.

Communication links 370-374 each use metal, glass, optical, air, space, or some other material as the transport media. Communication links 370-374 can each use various communication protocols, such as wireless communications, cellular communications, IEEE 802.11 (WiFi), Long Term Evolution (LTE), Time Division Multiplex (TDM), asynchronous transfer mode (ATM), Internet Protocol (IP), Ethernet, synchronous optical networking (SONET), hybrid fiber-coax (HFC), circuit-switched, communication signaling, or some other communication format, including combinations, improvements, or variations thereof. Communication links 370-374 can each be a direct link or can include intermediate networks, systems, or devices, and can include a logical network link transported over multiple physical links. Although one main link for each of links 370-374 is shown in FIG. 3, it should be understood that links 370-374 are merely illustrative to show communication modes or access pathways. In other examples, further links can be shown, with portions of the further links shared and used for different communication sessions or different content types, among other configurations. Communication links 370-374 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 4:
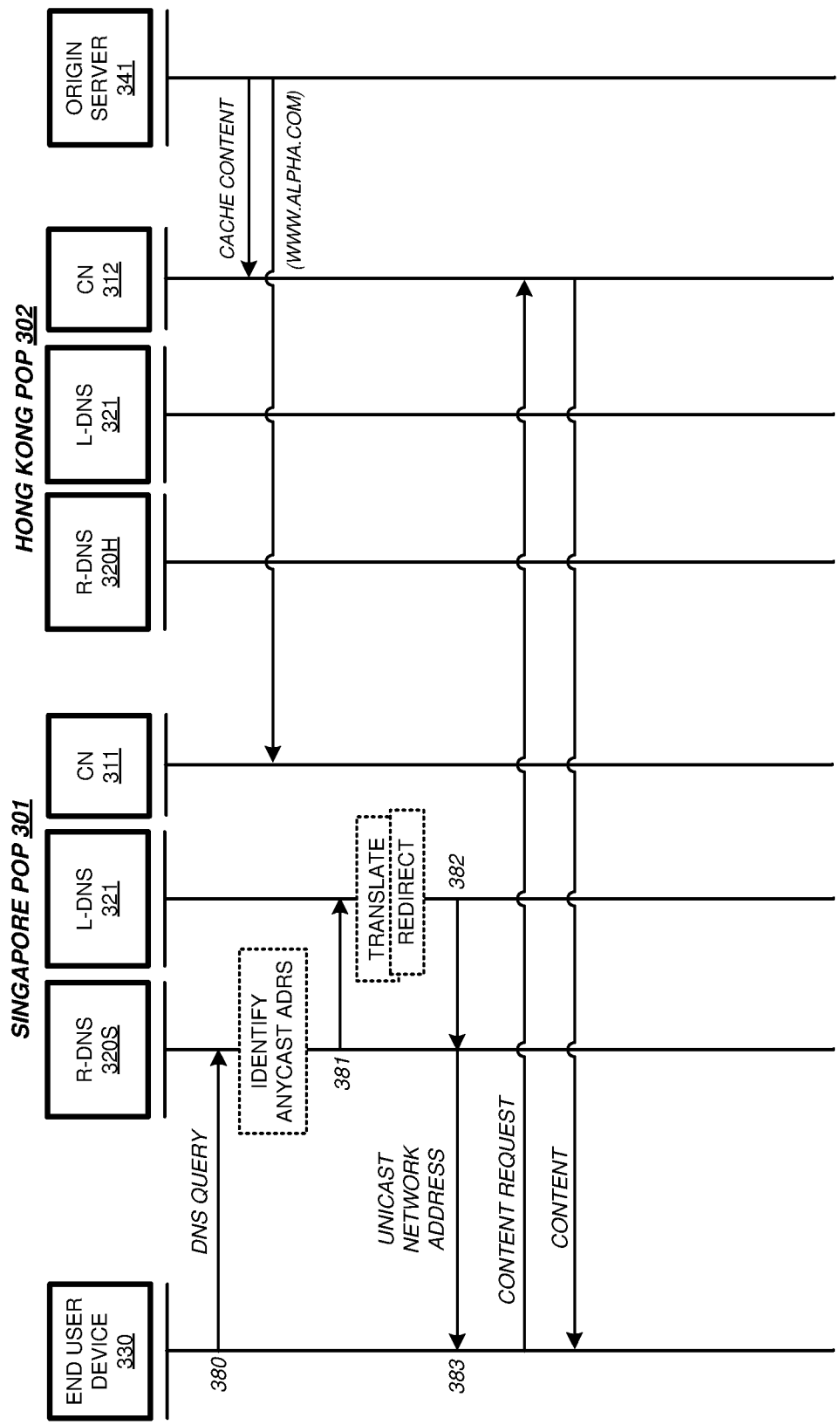
FIG. 4 illustrates method of operation of a content delivery network.

FIG. 4 is a sequence diagram illustrating a method of operating communication system 300. In FIG. 4, a user of end user device 330 desires to retrieve network content, such as a web page or media content associated with a web address. In this example, the web address comprises www.alpha.com, but could be any web address, including any associated pathnames and parameters. The web page can comprise various network content indicated by markup language, text, and scripts which reference other network content, such as images, videos, text, and the like. This network content can be referenced in the web page using one or more links or URLs. The network content can be cached into any of cache nodes 311 or 312, and can be cached responsive to content requests or preemptive before content requests are received by the associated cache node.

A user of end user device 330 can be interacting with end user device 330 via a web browser, smartphone app, or other application on end user device 330. To retrieve the network content, end user device 330 first transfers DNS query 380 to translate or resolve www.alpha.com into a network address from which to request the network content. End user device 330 can transfer DNS query 380 for receipt by a top level or authoritative DNS server, such as R-DNS server 320S in FIG. 3. In some examples, DNS query 380 is a part of a DNS lookup process to retrieve a network address of a particular cache node that caches the desired network content. DNS query 380 can be transferred over a packet network interface of end user device 330, such as an IP interface over a packet network comprising the Internet or one or more Internet service providers (ISPs).

R-DNS server 320S receives DNS query 380. DNS query 380 can be routed to R-DNS server 320S due to geographic considerations, network routing rules, or due to an explicit DNS server configuration of end user device 330. In some examples, R-DNS server 320S is associated with an ISP that provides network access to end user device 330, and thus any DNS queries issued by end user device 330 are routed to R-DNS server 320S. Once R-DNS server 320S receives DNS query 380 issued by end user device 330, R-DNS server 320S processes the DNS query against a DNS records 325S to identify a subsequent DNS node to handle DNS query 380. DNS query 381 can be transferred for delivery, and can comprise DNS query 380 but have various fields such as headers and source/target network addresses modified from DNS query 380. DNS records 325S can include associations between domain names and further DNS nodes indicated by network addresses. DNS records 325S can also include associations between domain names and cache nodes. However, in this example, DNS records 325S indicate an anycast network address for a further DNS node to handle DNS query 381.

As mentioned above, DNS records 325S/325H can correlate anycast network addresses to domain names for content handled by content delivery network 310. In anycast addressing, a single, common, network address can be used to route traffic to one particular destination among a plurality of destination nodes using the single network address. In this example, anycast routing may route DNS query 381 to any one of the DNS nodes associated with content delivery network 310, such as L-DNS nodes 321-322 in FIG. 3. As seen in FIG. 4, L-DNS node 321 receives DNS query 381 as a result of the anycast routing directed to a common network address associated with both L-DNS node 321 and L-DNS node 322.

However, when the anycast routing transfers DNS query 381 to L-DNS node 321 for servicing, L-DNS node 321 may not be the ideal L-DNS node from a performance standpoint for end user device 330. For example, end user device 330 might be in Hong Kong and anycast routing used by R-DNS server 320S might direct DNS query 381 to L-DNS node 321 in Singapore to service the DNS query instead of selecting L-DNS node 322 in Hong Kong to service DNS query 381. This may lead to lower performance for end user device 330, such as due to a higher latency for communications that have to be routed between end user device 330 in Hong Kong to L-DNS node 321 Singapore. Moreover, L-DNS node 321 is typically configured to translate domain names into network addresses associated with cache node 311 or other cache nodes at POP 301 in Singapore which can lead to further performance issues if end user device 330 is directed to receive content from cache node 311 by L-DNS node 321. In the examples herein, an L-DNS node can select a cache node in a POP or associated with another L-DNS node which can provide better performance for the requesting device and can be provided using the anycast process.

Specifically, L-DNS node 321 processes properties associated with DNS query 381 to redirect end user device 330 to another POP, such as POP 302. The properties can include a network address of end user device 330 or a network address of R-DNS server 320S. In some examples, DNS query 381 is routed initially to R-DNS server 320H and the anycast routing process routes the DNS query from R-DNS server 320H to L-DNS node 321. L-DNS node 321 can identify the network address of R-DNS server 320H from the packets associated with DNS query 381 and redirect end user device 330 to POP 302 in Honk Kong to receive content request servicing from cache nodes 312 based on the initial DNS server being R-DNS server 320H being in Hong Kong, even though L-DNS node 321 is associated with POP 301 in Singapore and cache nodes 311. In other examples, the network address of end user device is considered when redirecting.

L-DNS node 321 translates the domain name indicated by DNS query 381 into a network address associated with cache node 312 and POP 302. L-DNS node 321 then transfers DNS response message 382 to DNS query 381 that indicates this network address associated with cache node 312 for delivery to end user device 330. In some examples, DNS response message 382 is transferred through R-DNS server 320S en route to end user device 330 as further DNS response 383, while in other examples, DNS response message 382 is transferred without involvement of R-DNS server 320S. This network address associated with cache node 312 comprises a unicast network address and allows end user device 330 to transfer content requests for delivery to cache node 312.

To determine the network address to resolve for a domain name indicated by end user device 330 in DNS response message 382, L-DNS node 321 can consult data structure 326. Data structure 326 comprises correlations between cache node network addresses and the associated POPs and performance metrics for particular network address ranges. The network address ranges correspond to source network addresses of DNS queries, such as network address of end user devices that issue the DNS queries or of intermediary DNS nodes that receive and delegate the DNS queries, such as R-DNS 320S.

FIG. 7 shows an example data structure as table 700 which indicates particular cache nodes or POPs to which end user devices should be directed to based on source network address ranges. These address ranges can be established by monitoring performance, such as latency for content request fulfillment or DNS query response times, over a period of time to determine which POPs/cache nodes provide the best performance for devices or nodes that have the particular source network addresses. The address ranges are not necessarily based on geographic proximity to the POP or cache node. However, proximity can be taken into account when forming table 700. For example, L-DNS node 321 can determine that particular network addresses within a certain address range are typically associated with a particular country or region, and can determine which POP that provides the best performance for that particular country or region. This best POP might not be in the same geographic area as the network address ranges, such as when virtual private networks are employed which can direct traffic over a tunneled link from a first geographic region to a second geographic region and make an end user device appear to be in the second geographic region instead of the first geographic region.

In table 700, a first address range indicates that DNS queries with first source addresses that fall within that range should return a DNS response that indicates a network address of 150.140.130.111 which is associated with a Singapore POP. A second address range indicates that DNS queries with second source addresses that fall within that range should return a DNS response that indicates a network address of 150.140.131.111 which is associated with a Hong Kong POP. A third address range indicates that DNS queries with third source addresses that fall within that range should return a DNS response that indicates a network address of 150.140.132.111 which is associated with a Japan POP. A fourth address range indicates that DNS queries with fourth source addresses that fall within that range should return a DNS response that indicates a network address of 150.140.132.111 which is associated with a Malaysia POP. Further address ranges for each POP can be established and these address ranges can be modified or altered over time as conditions change and performances that are monitored can change. For example, network conditions, such as latencies, routing equipment upgrades, network cable changes, ISP upgrades, or other conditions, can change over time and continue to influence which address ranges correspond to which POP. It should be noted that table 700 can indicate an address range for handling by the local POP that initially receives the DNS request.

Once the network address is delivered to end user device 330, then end user device 330 issues one or more content requests for a content to the network address supplied with the DNS response, such as for web pages or media content associated with example domain name www.alpha.com. This content request can comprise one or more HTTP GET or POST request methods which are received by cache node 311. In this example, cache node 311 has cached network content associated with the requested web page (www.alpha.com) in a data storage system of cache node 311. This caching can occur responsive to the web page request from end user device 330, a previous request from another end user device for network content associated with www.alpha.com, or due to a 'pre-caching' process which caches predetermined website content prior to end user requests.

Figure 5:
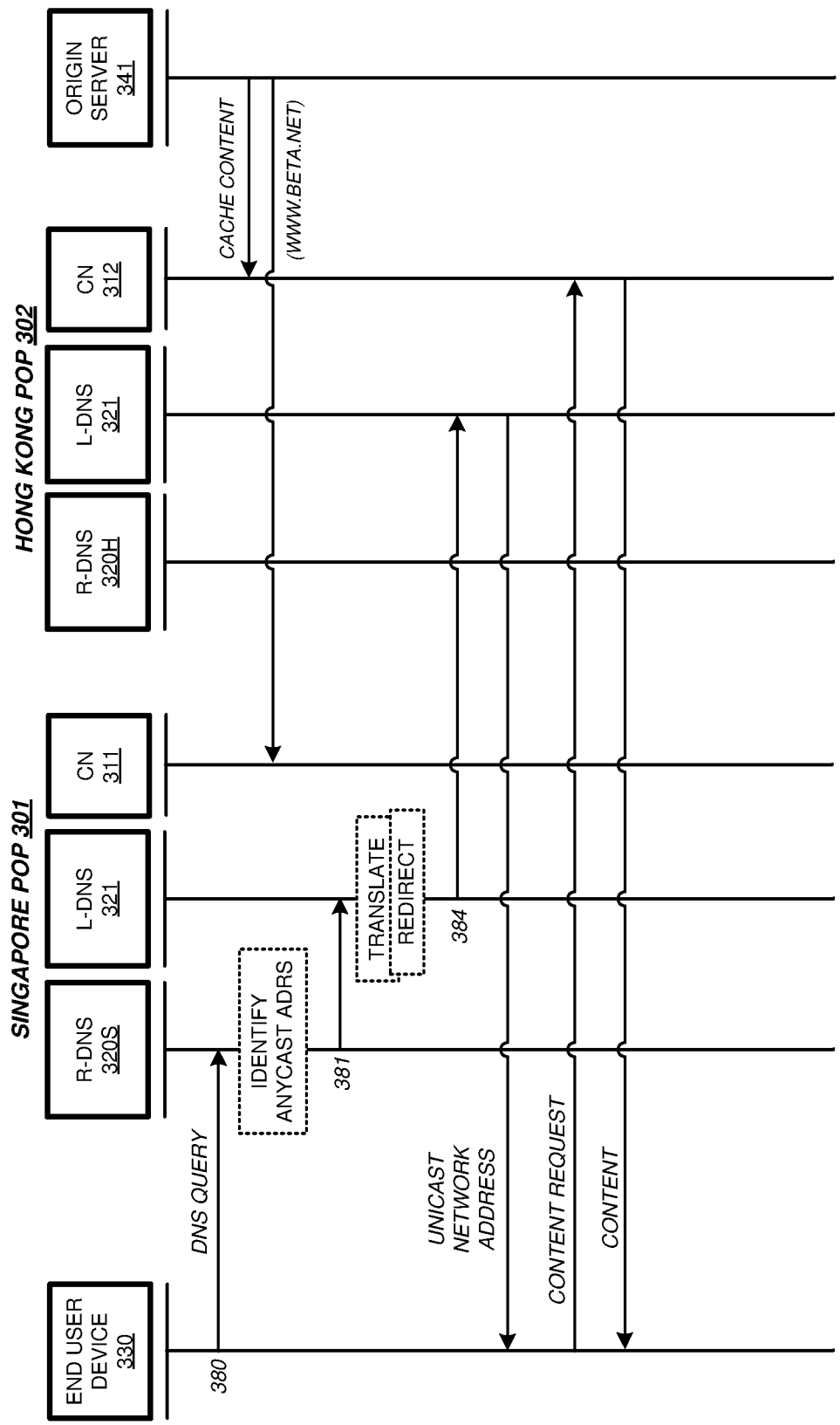
FIG. 5 illustrates method of operation of a content delivery network.

FIG. 5 is a sequence diagram illustrating an additional method of operating communication system 300. In FIG. 5, a similar process to that of FIG. 4 is detailed. However, instead of L-DNS node 321 transferring DNS response 381 for delivery to end user device 330, L-DNS node 321 instead redirects DNS query 382 to L-DNS node 322 as DNS query 383. L-DNS node 322 can then identify a network address of a content node or POP to which to resolve a domain name in DNS query 382. L-DNS node 322 then transfers this content address for delivery to end user device 330.

In FIG. 5, a similar data structure such as table 700 of FIG. 7 can be employed. This data structure can be used to identify DNS nodes to re-route or re-direct DNS queries. In this manner, a first L-DNS node at a first POP can transfer a DNS query to a more suitable L-DNS node at a second POP based on performance factors. These performance factors can be similar to those discussed for FIG. 4, such as latency, proximity, geographic, among other performance factors. However, instead of the L-DNS node that receives the DNS query doing translation or resolution to a content network address of another POP, the L-DNS node identifies another L-DNS node to perform the translation or resolution, where that other L-DNS node is associated with the POP which provides best performance to the end user device that issued the DNS query. Thus, L-DNS node 322 can provide end user device 330 with a content network address of cache node 312 instead of L-DNS node 321. L-DNS node 321 redirects this DNS query to L-DNS node 321 based on the performance metrics associated with network address ranges as described herein.

Figure 6:
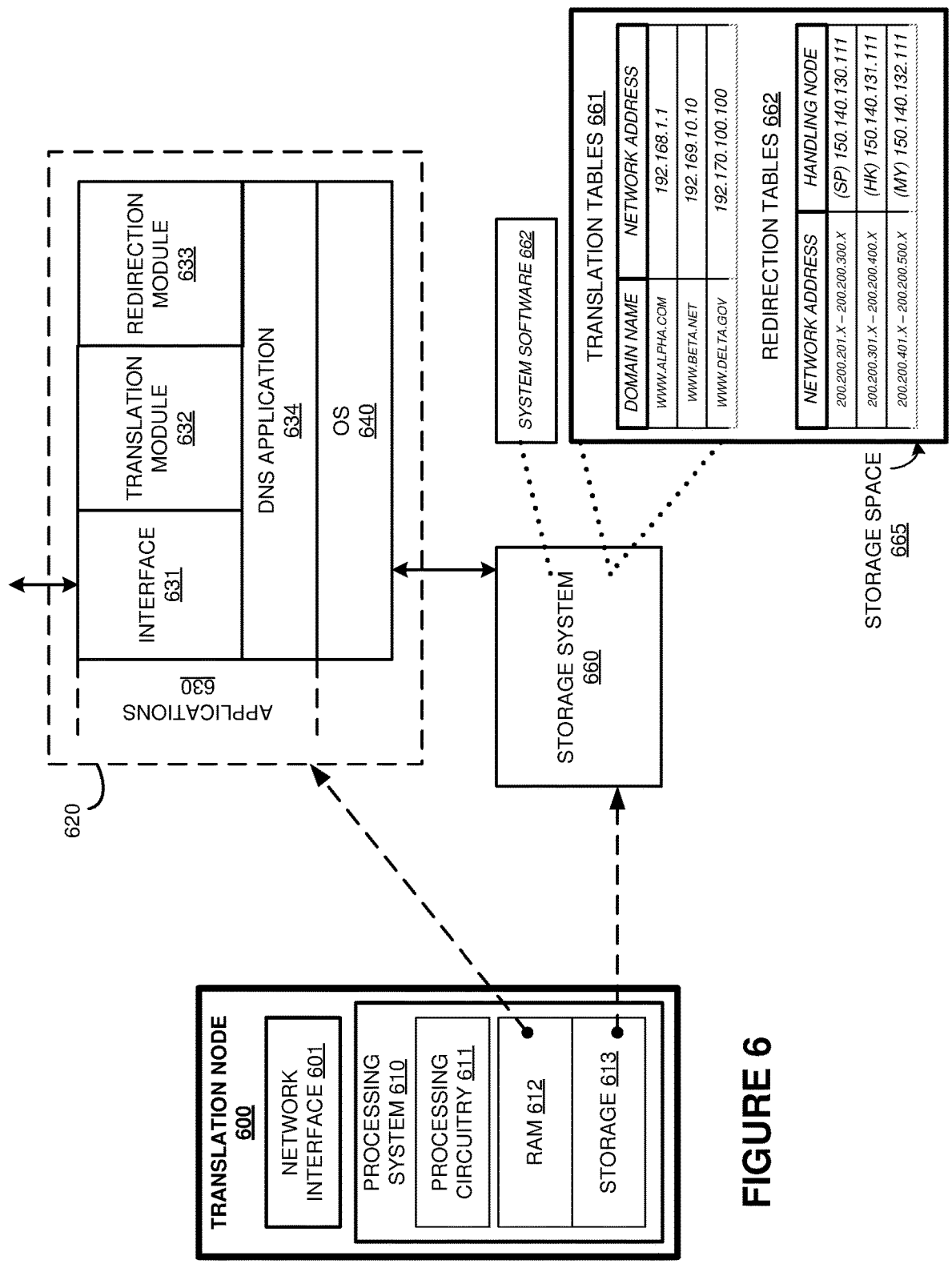
FIG. 6 illustrates a domain name translation node.

To further describe the equipment and operation of a translation node or L-DNS node, FIG. 6 is provided which illustrates translation node 600. Translation node 600 can be an example of translation nodes 120-121 of FIG. 1 and L-DNS nodes 321-322 of FIG. 3, although variations are possible. Translation node 600 includes network interface 601 and processing system 610. Processing system 610 includes processing circuitry 611, random access memory (RAM) 612, and storage 613, although further elements can be included, such as discussed in FIGS. 1 and 3. Example contents of RAM 612 are further detailed in RAM space 620, and example contents of storage 613 are further detailed in storage system 660.

Processing circuitry 611 can be implemented within a single processing device but can also be distributed across multiple processing devices or sub-systems that cooperate in executing program instructions. Examples of processing circuitry 611 include general purpose central processing units, microprocessors, application specific processors, and logic devices, as well as any other type of processing device. In some examples, processing circuitry 611 includes physically distributed processing devices, such as cloud computing systems.

Network interface 601 includes one or more network interfaces for communicating over communication networks, such as packet networks, the Internet, and the like. The network interfaces can include one or more local or wide area network communication interfaces which can communicate over Ethernet or Internet protocol (IP) links. Network interface 601 can include network interfaces configured to communicate using one or more network addresses, which can be associated with different network links. Examples of network interface 601 include network interface card equipment, transceivers, modems, and other communication circuitry.

RAM 612 and storage 613 together can comprise a non-transitory data storage system, although variations are possible. RAM 612 and storage 613 can each comprise any storage media readable by processing circuitry 611 and capable of storing software. RAM 612 can include volatile and nonvolatile, removable and non-removable media implemented in any method or technology for storage of information, such as computer readable instructions, data structures, program modules, or other data. Storage 613 can include non-volatile storage media, such as solid state storage media, flash memory, phase change memory, magnetic memory, or as illustrated by storage system 460 in this example. RAM 612 and storage 613 can each be implemented as a single storage device but can also be implemented across multiple storage devices or sub-systems. RAM 612 and storage 613 can each comprise additional elements, such as controllers, capable of communicating with processing circuitry 611.

Software stored on or in RAM 612 or storage 613 can comprise computer program instructions, firmware, or some other form of machine-readable processing instructions having processes that when executed a processing system direct translation node 600 to operate as described herein. For example, software drives translation node 600 to receive translation requests for translating domain names into network addresses, determine if another translation node should handle ones of the translation requests, translate domain names into network addresses, and redirect translation requests to other translation nodes, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 620 illustrates a detailed view of an example configuration of RAM 612. It should be understood that different configurations are possible. RAM space 620 includes applications 630 and operating system (OS) 640.

Applications 630 include interface 631, translation module 632, redirection module 633, and DNS application 634. Interface 631 handles receipt of translation requests or DNS queries and transfer of associated responses. Translation module 632 handles translation of domain names into network addresses, and can reference a data structure such as table 661 to correlate domain names to network addresses, such as IP addresses. Redirection module 633 handles redirection of DNS queries or other translation requests to other POPs or content nodes associated with other POPs than associated with node 600, and can reference a data structure such as table 662 to correlate network address ranges or requesting nodes to appropriate POPs. DNS application 634 can comprise a custom application, Knot DNS server software, domain name translation software, or other software applications that interact with interface module 631, translation module 632 and redirection 633, including variation, modifications, and improvements thereof. Applications 630 and OS 640 can reside in RAM space 620 during execution and operation of translation node 600, and can reside in system software storage space 662 on storage system 660 during a powered-off state, among other locations and states. Applications 630 and OS 640 can be loaded into RAM space 620 during a startup or boot procedure as described for computer operating systems and applications.

Storage system 660 illustrates a detailed view of an example configuration of storage 613. Storage system 660 can comprise flash memory such as NAND flash or NOR flash memory, phase change memory, magnetic memory, among other solid state storage technologies. As shown in FIG. 6, storage system 660 includes system software 662, as well as translation tables 661 and redirection tables 662 stored in storage space 665. As described above, system software 662 can be a non-volatile storage space for applications 630 and OS 640 during a powered-down state of translation node 600, among other operating software. Translation tables 661 include correlations between domain names and network addresses, such as IP addresses. Although only three rows of correlations are shown in FIG. 6 for clarity, it should be understood that many rows can be included in tables 661. In this example, tables 661 include translation information to identify network addresses associated with three web page domain names, as indicated by www.alpha.com, and www.beta.net, and www.delta.gov. Redirection tables 662 include correlations between requesting node network addresses or address ranges and handling translation nodes to which translation requests or DNS queries are to be redirected.

Translation node 600 is generally intended to represent a computing system with which at least software 630 and 640 are deployed and executed in order to render or otherwise implement the operations described herein. However, translation node 600 can also represent any computing system on which at least software 630 and 640 can be staged and from where software 630 and 640 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a content delivery network, the method comprising:
receiving, in a first local domain name server (DNS) in a first point-of-presence (PoP), a message from a first regional DNS, wherein the message comprises a request to translate a domain name to a network address of a cache node that caches content requested by an end user device;

in the first local DNS, determining to serve the content to the end user device from a cache node in a second PoP, wherein the second PoP includes a second local DNS; and providing the network address of the cache node from the first local DNS to the end user device.

2. The method of claim 1, further comprising, prior to providing the end user device with the network address of the cache node, translating the domain name to the network address of the cache node.

3. The method of claim 2, wherein providing the end user device with the network address of the cache node comprises:

in the first local DNS, redirecting the message to a second local DNS in the second PoP; and in the second local DNS, providing the end user device with the network address of the cache node.

4. The method of claim 1, further comprising:

identifying a network address of the first regional DNS; and identifying the cache node based on the network address of the first regional DNS.

5. The method of claim 1, further comprising:

evaluating performance factors of multiple PoPs based at least on latencies of domain name translations; and generating a data structure relating network addresses of the multiple PoPs and the performance factors.

6. The method of claim 5, wherein determining to serve the content to the end user device from a cache node in a second PoP is based on the data structure.

7. The method of claim 1, further comprising:

embedding code in content delivered to end user device that, when executed by the end user device, causes the end user device to monitor data latency statistics;

receiving the data latency statistics from the end user device; and determining the cache node to serve the content based on the latency statistics.

8. A method of operating a first local domain name system (DNS) in a first point-of-presence (PoP), the method comprising:

receiving, at the first local DNS, a request from an end user device to translate a domain name to a network address of a cache server that stores content requested by the end user device;

determining, at the first local DNS, that the content should be served to the end user device from a cache server in a second PoP, wherein the second PoP includes a second local DNS;

providing the network address of the cache server in the second PoP to the end user device from the first local DNS.

9. The method of claim 8, wherein providing the network address of the cache server in the second PoP to the end user device does not involve the second local DNS.

10. The method of claim 8, wherein the first PoP and the second PoP are in the same content delivery network and each comprise cache nodes, wherein the cache nodes cache content originating from origin servers.

11. The method of claim 8, further comprising:

identifying a network address of the first regional DNS; and determining that content should be served to end user device from the cache server in the second PoP based on the network address of the first regional DNS.

12. The method of claim 8, further comprising:

evaluating relative performances of a plurality of PoPs based at least on latencies of domain name translations; and generating a data structure relating network addresses of the plurality of PoPs and their relative performances.

13. The method of claim 12, wherein determining that the content should be served to the end user device from the cache server in the second PoP is based on the data structure.

14. The method of claim 8, further comprising:

embedding code in content delivered to end user device that, when executed by the end user device, causes the end user device to monitor data latency statistics;

receiving the data latency statistics from the end user device; and determining the cache node to serve the content based on the latency statistics.

15. A content delivery network comprising:

a means for receiving a message at a first local domain name server (DNS) of a first point-of-presence (PoP), wherein the message comprises a request to translate a domain name to a network address of a cache node that caches content requested by an end user device;

a means for determining to serve the content to the end user device from a cache node in a second PoP, wherein the second PoP includes a second local DNS; and a means for providing the network address of the cache node from the first PoP to the end user device, wherein the cache node comprises a server in the second PoP.

16. The content delivery network of claim 15, further comprising a means for translating the domain name to the network address of the cache node prior to providing the end user device with the network address of the cache node.

17. The content delivery network of claim 16, wherein the means for providing the end user device with the network address of the cache node comprises a means in the first PoP for providing the end user device with the network address, without involving the second local DNS.

18. The content delivery network of claim 15, further comprising:

a means for identifying a network address of a first regional DNS from which the message is received at the first PoP; and a means for identifying the cache node based on the network address of the first regional DNS.

19. The content delivery network of claim 15, further comprising:

a means for evaluating performance factors of multiple PoPs based at least on latencies of domain name translations; and a means for generating a data structure relating network addresses of the multiple PoPs and the performance factors.

20. The content delivery network of claim 19, wherein determining to serve the content to the end user device from a cache node in a second PoP is based on the data structure.

* * * * *